(12) United States Patent
Black et al.

(10) Patent No.: US 11,985,442 B2
(45) Date of Patent: May 14, 2024

(54) BIAS CIRCUIT WITH IMPROVED NOISE PERFORMANCE

(71) Applicant: Nu-Trek, Inc., San Diego, CA (US)

(72) Inventors: Stephen Holden Black, Tennessee Ridge, TN (US); Paul Richard Behmen, Chester, CA (US); Francisco Tejada, Kingsville, MD (US)

(73) Assignee: Nu-Trek, Inc., San Diego, CA (US)

( * ) Notice: Subject to any disclaimer, the term of this patent is extended or adjusted under 35 U.S.C. 154(b) by 461 days.

(21) Appl. No.: 17/384,275

(22) Filed: Jul. 23, 2021

(65) Prior Publication Data

US 2023/0027347 A1    Jan. 26, 2023

(51) Int. Cl.
*H04N 25/75* (2023.01)
*G01J 5/24* (2006.01)
*H04N 5/33* (2023.01)
*H04N 25/673* (2023.01)
*H04N 25/76* (2023.01)

(52) U.S. Cl.
CPC ............. *H04N 25/75* (2023.01); *G01J 5/24* (2013.01); *H04N 5/33* (2013.01); *H04N 25/673* (2023.01); *H04N 25/76* (2023.01)

(58) Field of Classification Search
CPC ...... H04N 25/75; H04N 25/673; H04N 25/76; H04N 25/618; H04N 25/709; H04N 25/21; G01J 5/24; G01J 2005/204
See application file for complete search history.

(56) References Cited

FOREIGN PATENT DOCUMENTS

EP    0897214    *   1/1999   ............... H03F 3/08

* cited by examiner

*Primary Examiner* — David P Porta
*Assistant Examiner* — Meenakshi S Sahu
(74) *Attorney, Agent, or Firm* — Mark Rodgers

(57) ABSTRACT

Bias circuit elements for applying voltages/currents to a photodetector are described. Bias circuit elements described are active devices, e.g. mosfets, directly connected to the photodetector signal point, which inject noise that will be amplified/integrated. Lowering 1/f noise in these bias devices uses multiple parallel mosfets and switching the parallel mosfets gates between a bias activation level signal and a voltage sufficient to drive the mosfet into accumulation Gate switching may be accomplished by at least two partially out of phase clocking signals, with at least one parallel mosfet applying bias while another is in accumulation in continuously switched time periods. Gate switching at a frequency higher than the imaging bandwidth, will have negligible effect on the image signal. During the accumulation phase traps present within the conducting channel of each MOSFET will be depopulated, essentially resetting the MOSFET's 1/f noise, allowing for long integration times while controlling 1/f noise.

16 Claims, 6 Drawing Sheets

BIAS CIRCUIT WITH IMPROVED NOISE PERFORMANCE

BACKGROUND

The specification relates to bias circuits for photodetectors, and in particular to noise performance improvement for bias circuits used in applications where 1/f noise may be a large contributor to overall signal to noise performance.

Imaging sensors, which often take the form of Focal Plane Arrays (FPA's), may include microfabricated arrays of photodetectors mated with, or fabricated on, microfabricated Read-Out Integrated Circuits (ROIC's). These hybrid "chips" benefit from improvements in microfabrication technologies, particularly to the advances in density of circuitry, in turn allowing for new approaches to FPA design. Such improvements are particularly interesting for imagers operating in the infrared spectral regions as such imagers generally face more design challenges than visible spectrum imagers. New FPA configurations provide opportunities for expanding the use and application of longer wave imaging technologies, but also present new problems to be addressed.

SUMMARY

Example embodiments described herein have innovative features, no single one of which is indispensable or solely responsible for their desirable attributes. Without limiting the scope of the claims, some of the advantageous features will now be summarized.

In some embodiments, a portion of a bias circuit for applying predetermined voltages and/or currents to a photodetector may be provided. The portion of the bias circuit addressed in particular are the active devices, e.g. mosfets, that are directly connected to the photodetector signal point, and thus inject noise directly to the node that will be amplified and/integrated. An exemplary approach to lowering 1/f noise in these bias devices involves running multiple mosfets in parallel, and switching the gates of the parallel mosfets between a bias control activation level signal and a voltage sufficient to drive the mosfet into accumulation The gate switching may be accomplished by at least two partially out of phase clocking signals connected to each gate switch, such that at least one parallel mosfet is applying bias while another is in accumulation in continuously switched corresponding time periods. If the gate switching is done at a frequency significantly higher than the imaging bandwidth, then the effect on the image signal will be negligible. During the accumulation phase traps present within the conducting channel of each MOSFET will be depopulated, essentially resetting the MOSFET's 1/f noise, thereby allowing for long integration times while controlling 1/f noise.

In a first aspect, a bias circuit for a photodetector readout circuit may be provided, including at least a first mosfet and a second mosfet in parallel with each other in series with the photodetector; at least two clocking signals at least partially out of phase with each other, wherein; one clocking signal may be applied to a switch switching the gate of the first mosfet between two voltage levels and the other clocking signal may be applied to a switch switching the gate of the second mosfet between the same two voltage levels; and the two voltage levels may be a control voltage suitable to activate the mosfet to a predetermined level and a voltage suitable to drive the mosfets into accumulation whereby at least one of the parallel mosfets may be activated while at least one other may be in accumulation for corresponding periods of time.

In one embodiment of the first aspect, a clocking rate of the clocking signals may be greater than the rate at which the 1/f noise "knee" of the noise power spectral density from the parallel mosfets operating without clocking is equal to the sensor's white noise floor. In another embodiment of the first aspect, the photodetector may be part of an imaging array, and the imaging period may be at least a portion of an image frame rate period.

In one embodiment of the first aspect, the bias circuit further may include switches which switch the polarity of the photodetector relative to the two parallel mosfets. In another embodiment of the first aspect, the polarity switches may be each actuated by one each of the same two at least partially out of phase clocking signals. In one embodiment of the first aspect, the polarity of the photodetector may be switched relative to the mosfet currently not in accumulation on each cycle.

In one embodiment of the first aspect, the photodetector may be a photoconductive detector. In another embodiment of the first aspect, the photodetector may be a bolometer.

In a second aspect, a bias circuit for a photodetector readout circuit may be provided, including: a current source in series with a blind reference photodetector in one leg of a bridge circuit; a current mirror configured to mirror the voltage present on the blind reference photodetector onto an active photodetector; at least two clocking signals at least partially out of phase with each other, wherein; the current mirror comprises at least a first and a second mosfet in parallel with each other and in series to the active photodetector; one clocking signal is applied to a switch switching the gate of the first mosfet between two voltage levels and the other clocking signal is applied to a switch switching the gate of the second mosfet between the same two voltage levels; and the voltage levels are the current mirror control voltage suitable to activate the mosfet and bias the photo detector and a voltage suitable to drive the mosfets into accumulation whereby at least one of the parallel mosfets is activated while at least one other is in accumulation for corresponding periods of time.

In one embodiment of the second aspect, a clocking rate of the clocking signals may be greater than the rate at which the 1/f noise "knee" of the noise power spectral density from the parallel mosfets operating without clocking intersects with the sensor's white noise floor. In another embodiment of the second aspect, the photodetector may be part of an imaging array, and the imaging period may be at least a portion of an image frame rate.

In one embodiment of the second aspect, the bias circuit may further include switches which switch the polarity of the photodetector relative to the two parallel mosfets. In another embodiment of the second aspect, the polarity switches may be each actuated by one each of the same two at least partially out of phase clocking signals. In one embodiment of the second aspect, the polarity of the photodetector may be switched relative to the mosfet currently not in accumulation on each cycle In another embodiment of the second aspect, the photodetector may be a photoconductive detector. In one embodiment of the second aspect, the photodetector may be a bolometer.

BRIEF DESCRIPTION OF THE DRAWINGS

Aspects and advantages of the embodiments provided herein are described with reference to the following detailed description in conjunction with the accompanying drawings. Throughout the drawings, reference numbers may be reused to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Figure 1A:
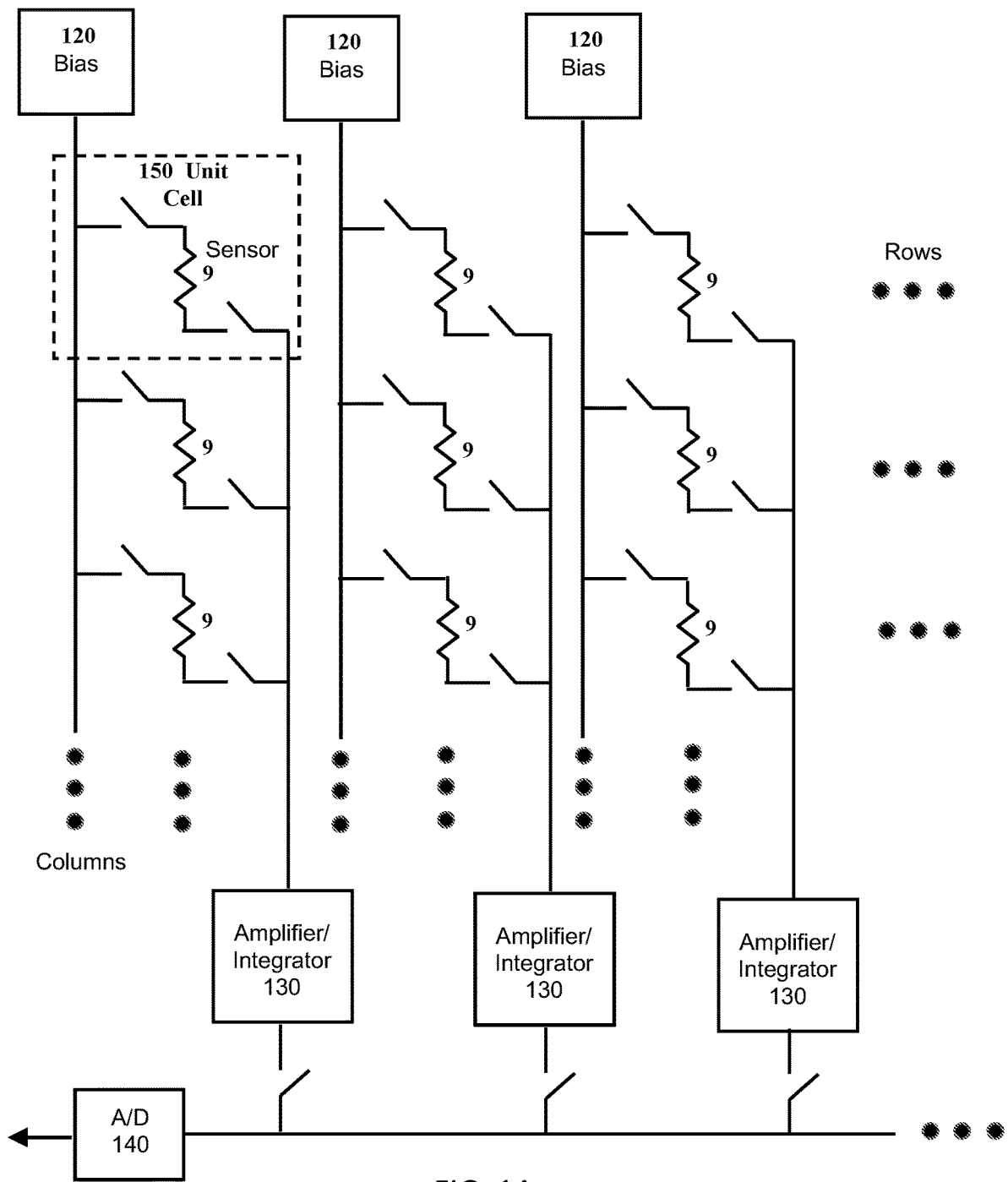
FIGS. 1A and 1B illustrate exemplary FPA detector and Read Out arrangements.

Generally, the embodiments described herein are directed to a portion of the Readout electronics associated with a photodetector. In many cases photodetectors are employed as imaging or tracking devices, and as such are often built into arrays of detectors. Common imaging arrays include CMOS technology based visible imaging arrays that are the heart of digital cameras. The current disclosure although applicable to common visible cameras is more directed to imaging arrays for applications such as low light, Infrared, Thermal, or other camera types whose design is more challenging than conventional visible imagers.

Most modern imagers include a microfabricated array of photodetectors, with the array a single die of a wafer, meaning the arrays are batch fabricated. The type of photodetector depends on the imaging application and a wide variety of detector types exist. Simple visible imagers may use an array of silicon CMOS photodiodes. Short and medium wave IR photodetectors may be based on non-standard semiconductors, such as PbS, quantum dots or HgCdTe photodiodes or photoconductors. Longwave Thermal photodetectors may be microbolometers, which are MEMS devices derived from silicon wafer fabrication. Other types of photodetectors exist as well, but other than for conventional visible cameras, the fabrication techniques for many photodetector arrays often require fabrication approaches beyond what is required for typical silicon wafer processing.

The arrays of photodetectors require interface electronics to convert the light dependent signal into useful data. For modern imaging arrays, the most common useful data is a digital stream of video data, where the magnitude of the digital information from each pixel is proportional to the intensity of the light incident on said pixel. Accordingly, the array of photodetectors needs to be interfaced to a suite of electronics that performs a series of functions. Referring to FIG. 1B, an example set of required elements to acquire and process signals from a sensor 9 is shown schematically. Photodetector, detector, and sensor will be used interchangeably in the current disclosure. Many light sensors, such as photodiodes or photoconductors, require a controlled bias voltage or current source 120 to operate. The change induced in the bias by light acting on the sensor needs to be buffered, amplified, and often integrated and sampled 130, and then converted to a digital value using an Analog-to-Digital converter (A/D) 140. Then the digital values from each photodetector must be organized and output, often as a digital data stream. The electronics to accomplish these typical tasks is often implemented as CMOS silicon integrated circuitry. i.e. mosfet transistors and suitable passive elements, although other circuit fabrication/material technologies are possible.

Modern imagers are typically made by mating an array of photodetectors with a circuit referred to as a Readout Integrated Circuit (ROIC) to produce a complete imaging chip often referred to as a Focal Plane Array (FPA). Each FPA is a hybrid of an array of photodetectors and a read out circuit, the readout, often but not necessarily, based on CMOS technology. Each ROIC is usually a die from a wafer. Depending on the type of detector, the corresponding Photodetector arrays may be made on a separate wafer that is bonded to the ROIC wafer such that each sensor/ROIC die is permanently mechanically and electrically integrated, or the detectors may be fabricated on top of or a part of the ROIC wafer. For instance, when the wafer materials are different, such as an HgCdTe sensor array mated with a silicon CMOS read out, two separately processed and then bonded together wafers are required. Some Microbolometer types can be fabricated on top of the ROIC wafer, so the entire FPA is made from one wafer (although sometimes a second, very simple, wafer is used as a vacuum cap). At any rate, the processing of both photodetector array and ROIC are usually performed at the wafer scale, and the resulting FPA's are single combined die from the wafer(s).

The readout circuit accesses each photodetector and converts the array of photodetector signals to a video data stream. Each portion of the stream, corresponding to all or part of the array captured within a given time, constitutes a "frame of data", and the number of frames output per unit time is the frame rate of the video stream. Not all FPA's for all applications take the data all the way to video, leaving some of the processing to be done off chip. Some more advanced FPA designs do more, such as image processing operations on chip, but wherever the functions reside, the basic interface elements shown in FIG. 1B usually exist somewhere in the imaging system.

Given the above, a key aspect of FPA design entails the arrangement of the interface elements, and in particular how to allocate the elements in terms of which elements are dedicated to each photodetector, and which elements are shared, i.e. switched between each photodetector in some time sliced manner. The size of each sensor, or pixel, in the array is related to the wavelength of the light the sensor is intended to detect and the complexity of the required interface circuitry. For visible imaging, pixels will be no smaller than a few hundred nanometers on a side. Pixel dimension range up to thermal imaging pixels which may be on the order of 10 microns or more in size. Even though visible imagers can be made entirely using state of the art silicon processing, ROIC designs carry the unique constraint that all circuitry required to interface with the pixel must be confined within the pixel footprint. And even thermal pixels, given they are normally fabricated using at least somewhat non-standard, larger geometry processing techniques, don't provide a lot of room for circuit elements. Accordingly, the number of circuit elements that can fit under a single sensor, i.e. the dedicated interface elements, can be constrained by the pixel size. The portion of the ROIC directly under, and dedicated to, a single pixel is often referred to as the "unit cell." If not all of the interface elements can be put into the unit cell, the unit cell signals must be physically brought to the elements outside the boundary of the imaging area. It would be cumbersome electrically, and makes for a very large FPA chip, if dedicated elements existed for each sensor, so a typical approach is to "share" circuit elements by way of sequential switching of each sensor to shared elements. This common arrangement is illustrated schematically in FIG. 1A, referred to as a "Pulse Bias" FPA because each sensor experiences a turn on condition, i.e. bias applied for only apart of a frame time.

Figure 1B:
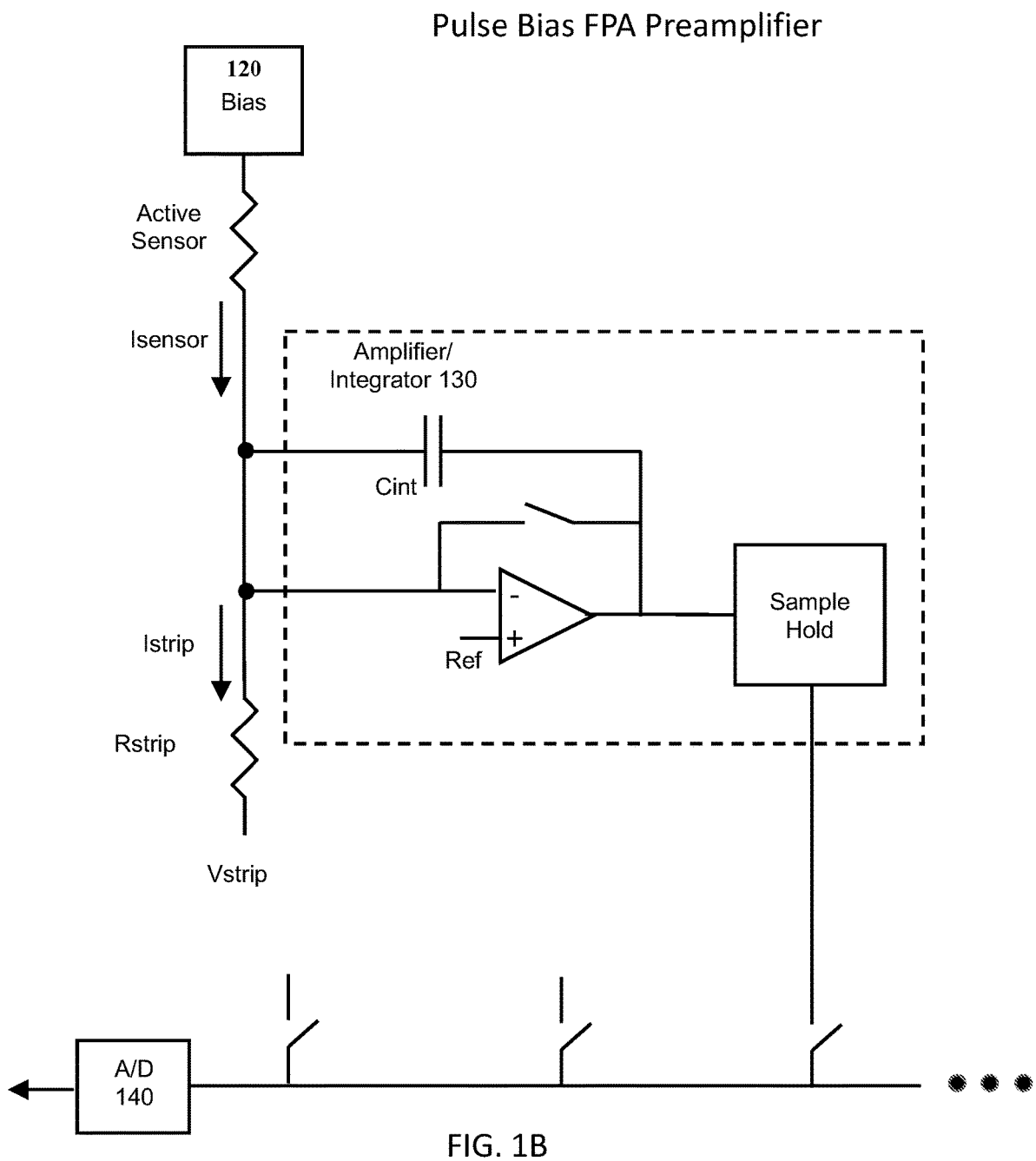

FIG. 1A shows part of an array of sensors 9. Imaging arrays are often arranged in columns and rows. To improve compatibility with display formats, standardized sizes and frame rates exist. For instance, the VGA standard is 640 rows by 480 columns with a frame rate of 60 Hz. HDTV is 1080×720 at 60 Hz. Non-standard imaging applications are more apt to benefit from the teachings of the current disclosure, but the standard formats provide example of the timing which underlies some of the motivation leading to the current disclosure.

In FIG. 1A, unit cell 150 is shown by example as containing relatively few dedicated elements, just switches that allow sequential connection of each sensor 9 to bias elements 120 and Amplifier/Integrator elements 130. The example shown in FIG. 1A shows each column of sensors sharing all or part of the bias 120 and amplifier 130 elements, with one A/D per FPA 140. The timing is controlled by a large number of switches, often implemented as mosfet switches, and clocking signals, not shown, controlling the timing, both internal and readout video stream timing. The example in FIG. 1A is very light on unit cell components. In terms of the trade-off between unit cell dedicated elements and shared resources shared between unit cells, many variations are possible, other than that shown. However any sharing of on FPA chip resources has consequences on imaging parameters. What is important to note is that if resources are shared, then a lot of switching on and off of photodetectors needs to happen within each frame time, limiting the time each photodetector is active, and for a given frame rate this time shrinks as the number of the pixels in the FPA increases. With reduced active time comes increased electrical bandwidth and in analog circuitry a corresponding increase in noise and a reduction in signal to noise ratio.

In visible imaging, image contrast in a scene, expressed as the ratio of the brightest to darkest region can be 100%, however with thermal imaging the entire scene "glows" at a more or less uniform level, with the image being small (<10%) variations in this glow. Due to the inherent small signals present, maximizing the signal to noise (SNR) of the detected signal is of the upmost importance.

Sensors that operate directly at thermal wavelengths, such as microbolometers, are less sensitive to temperature changes in the bolometer induced by incident thermal radiation than they are to changes in their own ambient temperature, due to the fact that the transfer function between the temperature of a point in the image and the microbolometer's own temperature <<1. This means that the ROIC circuitry must be exceptionally low noise to achieve high SNR and must reject the large signal induced by changes in the sensor's ambient temperature.

Shared resource, or pulse bias type FPA's have drawbacks for more sensitive sensors. The short collection times increase the ROIC's noise bandwidth, reducing SNR, with the bandwidth increasing with increased spatial resolution (number of pixels). This is addressed in microbolometer sensors by driving the bolometer harder to increase it's response, this comes at the cost of reduced scene thermal dynamic range and increased non-linearity.

However, advances in circuit density, both due to decreasing linewidths in integrated circuit fabrication, and more advanced topologies such as multi-layer fabrication, make increasing the complexity of dedicated unit cell circuitry possible. More complex unit cell designs may be desirable for some applications even if they come with increased design time/cost.

Figure 2:
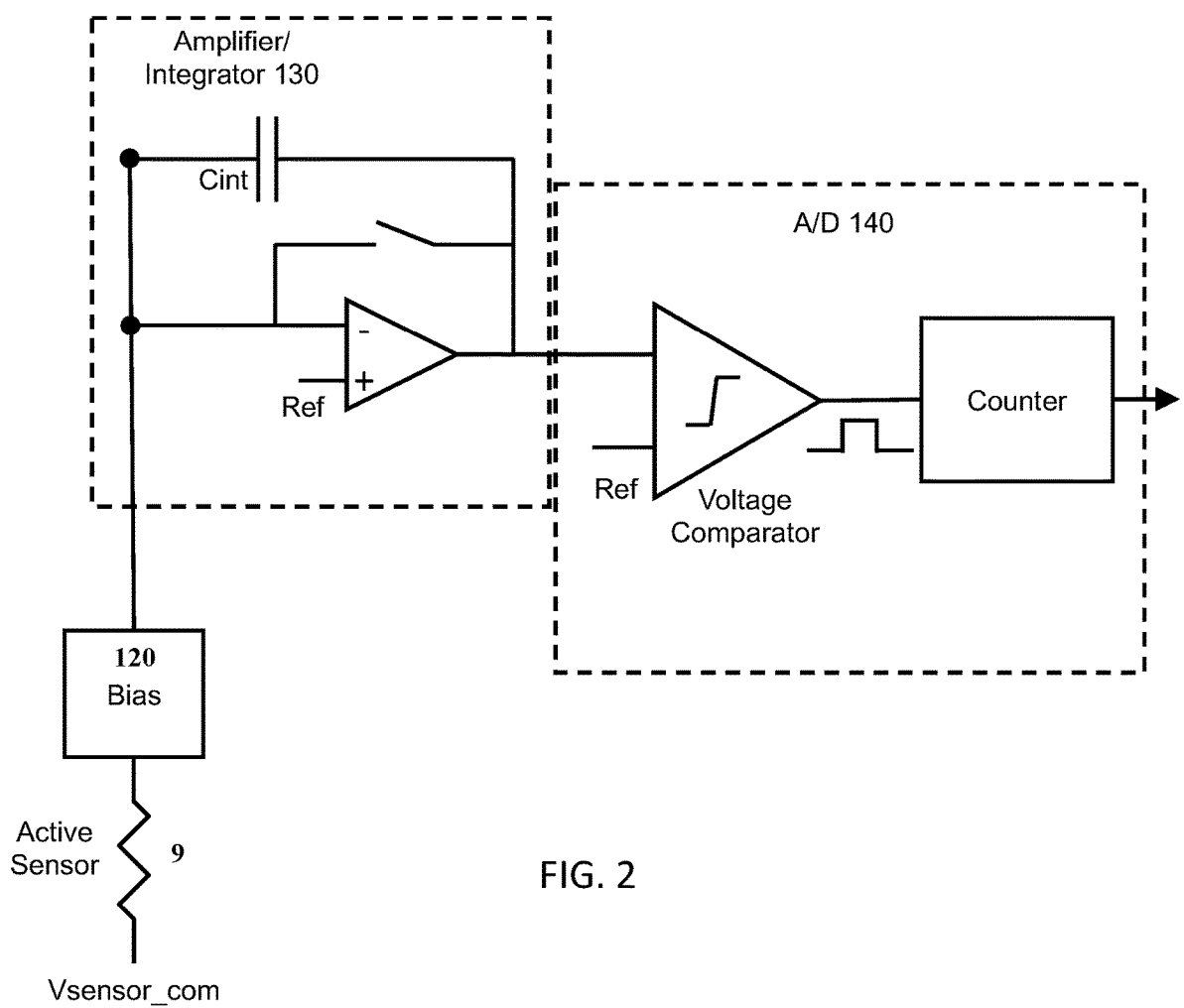
FIG. 2 illustrates an alternative digital pixel readout arrangement.

FIG. 2 shows an example "digital pixel" design for a unit cell, where all of the interface elements, Bias 120, Amplifier/Integrator 130, and A/D 140 needed to acquire and convert the sensor 9 signal to a digital value are present in every unit cell. Examples of the type of circuits that may be present in the elements are shown, and it should be noted that the functional blocks shown, amplifiers and digital circuits, actually consist of multiple transistors, so compared to a shared resource FPA, there are significantly more components in the example digital pixel unit cell than in a shared resource FPA design. However, the output of the unit cell is a digital value that can be held indefinitely, such as in a shift register or memory. Accordingly, a unit cell design of the type shown allows for each array sensor to acquire (integrate) signal for up to a full frame time and pass the digital data on for readout at the end of the integration time. And this is true regardless of the pixel count of the array. Thus, the signal detection of even low sensitivity detectors such as uncooled bolometers can approach cooled detector performance without the need for elaborate cryogenic coolers and do so even for very large pixel count arrays. Such capability is highly desirable to simplify the design of sensors that can detect low intensity signals with high spatial resolution, such as required for commercial and military sensors as well as other applications.

However, to achieve the type of performance possible, the FPA noise must be minimized. A wealth of pulse bias FPA design techniques exist for image quality enhancement by improving signal to noise at the chip level as well as in image processing. Many of these problems are reduced by digital pixel designs, but some digital pixel noise problems are different and, in some cases, worse. In particular low frequency noise effects such as 1/f noise can be a problem with the longer integration times possible with these FPA's. This disclosure addresses a particular noise source, the bias circuitry.

Sensors such as microbolometers or photoconductors require the application of a bias voltage or current to operate. In response to environmental stimulus, e.g. incident radiation on the sensor, the sensor modulates the voltage appearing across the sensor in the case of a current bias, or the current flowing in the sensor in the case of a voltage bias. This applied bias must have an intrinsic noise lower than that of the sensor to prevent bias noise from degrading the sensitivity of the overall system. In pulse bias microbolometer sensors, a resistor (Rstrip in FIG. 1B) is often used for this purpose, as the flicker and channel thermal noise of active devices can otherwise dominate sensor performance. While effective, a resistive bias carries the drawback that it requires a significant amount of real estate to implement in an integrated circuit. Large resistors are doable in circuits employing pulse bias, where only some sensors (a row, single sensor, or some other subset of the whole array) are active (and biased) at a given point in time. For such FPA's, the circuitry under each pixel can be as little as a few simple switches, leaving most of the area under the array available for resistors. Digital pixel architectures, as described above, place a significant amount of active circuitry under each pixel. They also support more sensitive sensor types, such as higher resistance bolometers (which require a higher bias resistance), so an alternative bias approach is required. In this disclosure, the sensor element is actively biased using a voltage set by one or more source followers, usually mosfets, which are sequentially switched from being activated to being in accumulation to depopulate traps in the device's channel to suppress flicker (1/f) noise.

Figure 3A:
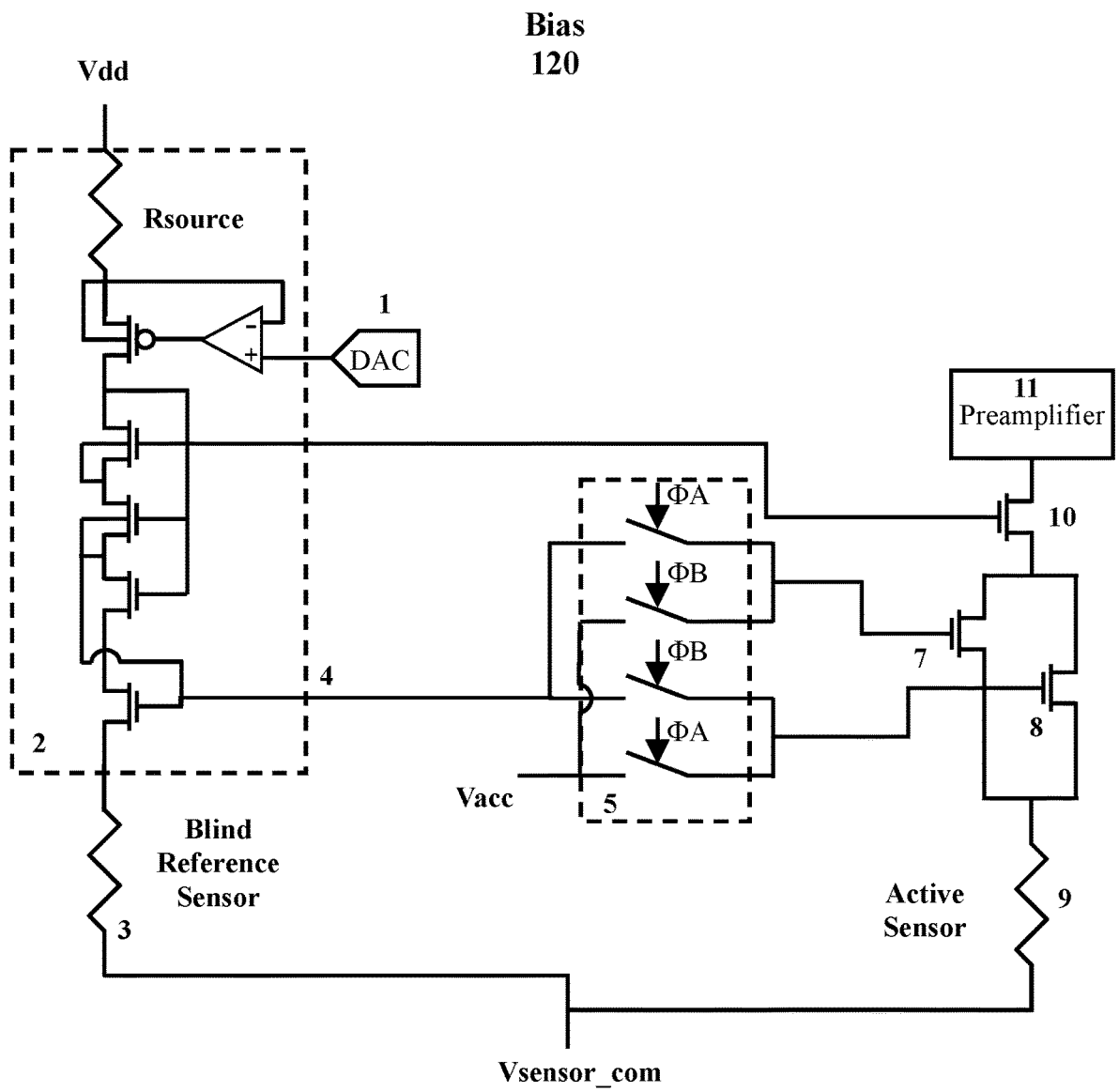
FIGS. 3A and 3B illustrate one example embodiment of the novel bias circuit.
Figure 3B:
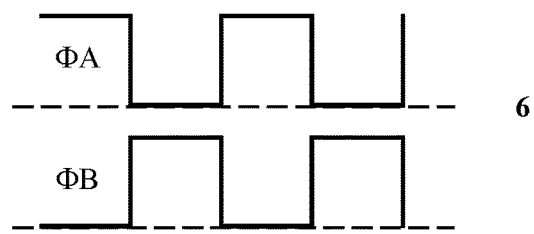

A bias approach to apply a low noise bias to a sensing element, such as that found in an FPA, is illustrated in FIGS. 3A and 3B. FIG. 3A depicts an example bias circuit's schematic. A digital to analog converter (DAC) 1 sets the voltage across resistor Rsource, which sets the current in current source 2. This current is applied across one of more reference sensors 3, which are not exposed to the incident radiation being sensed, however they represent the resistance of the sensor making up the focal plane array at the focal plane array's operating temperature. The Bias control activation voltage 4 represents the gate voltage required to bias the sensor at the current set by the current source 2. Bias control activation voltage 4 is passed through a switch 5 to the gates of a pair of source followers 7 and 8.

Such a bridge structure for biasing sensors using a blind detector in differential mode to subtract out sensor temperature dependency is one way to bias a sensor. The bridge/blind sensor arrangement is used by way of example only, and though a useful approach, is not part of the novelty of the current disclosure. Accordingly, it may be considered as a functional block. However, a controlled bias is generated, at some point there will be active bias control elements connected to the sensor 9. These active elements will usually be one or more transistors, such as mosfets, and for purposes of disclosing the novel bias noise reduction approach, in FIG. 3A, they are elements 7 and 8. The novel noise reduction approach will now be described.

Switch (5) may for example, be a pair of single pole/double throw devices, composed of transmission gates and controlled by timing pattern (6). Timing pattern (6) consists of two non-overlapping clocking signals, ΦA and ΦB, shown in FIG. 3B. For clarity the two clocking signals are shown as fully out of phase, but other timing would be acceptable as long as during each cycle one signal is alternately on and one alternately off for a non-overlapping time. When ΦA is high voltage (4) is applied to the gate of MOSFET (7) through switch (5), turning it on and causing a current mirroring that flowing in (2) to flow in the active sensor (9). Simultaneously, the voltage Vacc is applied to the gate of MOSFET (8) through switch (5), turning it off and placing the channel into accumulation and depopulating any surface traps in MOSFET (8) channel. This effect is known to essentially reset any built up 1/f noise in the transistor. When (DB is high, Vacc is applied to the gate of MOSFET (7) through switch (5) and voltage (4) is applied the gate of MOSFET (8) through switch (5), resulting in the surface traps in MOSFET (7) channel being depopulated and the current mirroring that flowing in (2) to flow in the active sensor (9). The currents flowing in (7) and (8) are combined and pass through cascode device (10) into the preamplifier (11), again by way of example, but not limiting as other signal extraction approaches are possible.

Figure 4:
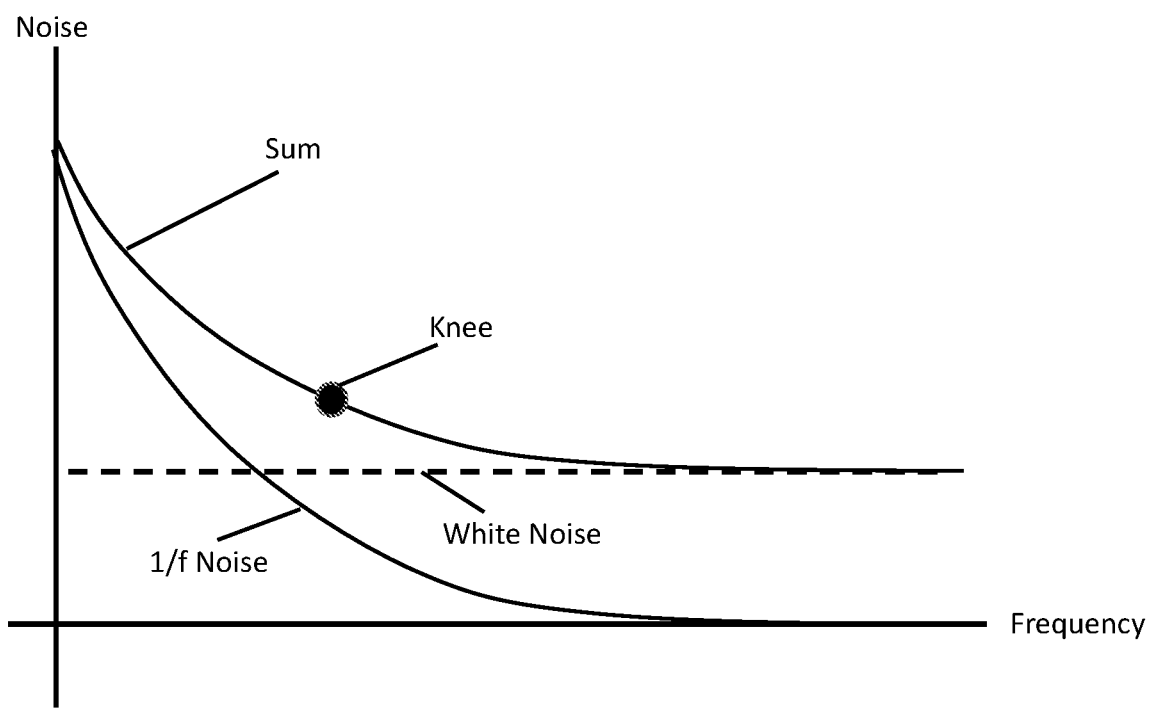
FIG. 4 illustrates the behavior of the various noise sources relative to each other.

Referring to FIG. 4 the behavior of the noise sources is shown. Every circuit contains devices having both white and 1/f noise. If one examines the power spectral density (PSD) of the overall noise one will see a frequency where the 1/f noise amplitude has decayed to the point where it is equal to the white noise. This is known as the "corner" or "knee" frequency. If we clock the devices at a rate higher than the corner frequency the 1/f noise is largely eliminated Thus switching rate is dependent on the point where the 1/f noise knee in (7) and (8) is equal to the combined white noise floor in (7), (8) and (9). This frequency will depend on the exact configuration of a circuit, but is generally greater than 1 KHz, but is certainly above the sensor signal bandwidth, which is related to the frame rate, usually 10's of Hz.

Figure 5A:
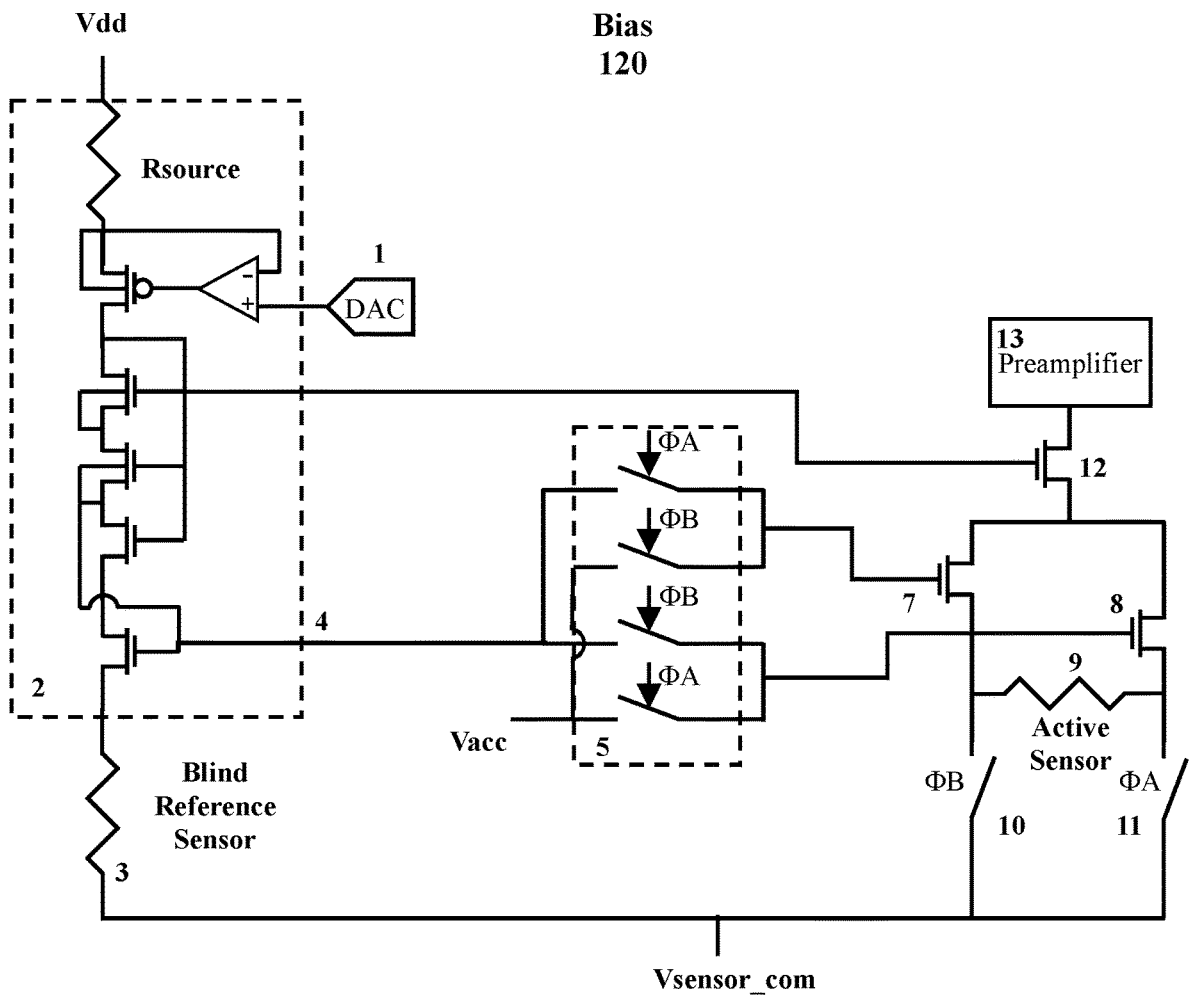
FIGS. 5A and 5B illustrate another example embodiment of the novel bias circuit.
Figure 5B:
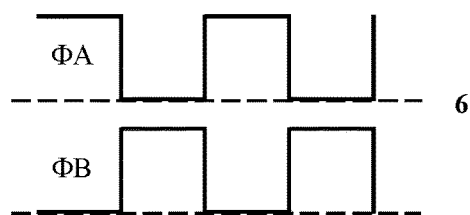

FIGS. 5A and 5B depicts an alternate bias circuit schematic. A digital to analog converter (DAC) (1) sets the voltage across resistor Rsource, which sets the current in current source (2). This current is applied across one of more reference sensors (3), which are not exposed to the incident radiation being sensed, however they represent the resistance of the sensor making up the focal plane array at the focal plane array's operating temperature. The bias control activation voltage (4) represents the gate voltage required to bias the sensor at the current set by the current source (2). Voltage (4) passes through a switch (5) to the gates of a pair of source followers (7) and (8). Switch (5) consists of a pair of single pole/double devices, composed transmission gates and controlled by timing pattern (6). Source followers (7) and (8) also form the high side of an H-bridge composed of source followers (7) and (8) and switches (10) and (11), with the active sensor connected across the H-bridge, with current alternately flowing through source follower (7) and switch (11) then source follower (8) and switch (10), with the direction of current flow being reversed in each alteration. This has the benefit of sweeping traps out of certain photoconductive detectors such as various lead salt sensors.

Timing pattern (6) consists of two non-overlapping signals (FIG. 4B), when ΦA is high, activation voltage (4) is applied to MOSFET (7) through switch (5), turning it on and causing a current mirroring that flowing in (2) to flow in the active sensor (9), while also turning on switch (11) to complete the circuit. Simultaneously, the voltage Vacc is applied to the gate of MOSFET (8) through switch (5), turning it off and placing the channel into accumulation and depopulating any surface traps in MOSFET (8) channel. When ΦB is high voltage (4) is applied to MOSFET (8) through switch (5), turning it on and causing a current mirroring that flowing in (2) to flow in the active sensor (9), while also turning switch (10) reversing the direction of current flow in the active sensor (9). Simultaneously, the voltage Vacc is applied to the gate of MOSFET (7), turning it off and placing the channel into accumulation and depopulating any surface traps in MOSFET (7) channel. The currents flowing in (7) and (8) are combined and pass through cascode device (12) into the preamplifier (13). The switching rate is dependent on the point where the flicker noise knee in (7) and (8) intersects with the combined white noise floor in (7), (8) and (9) and is generally greater than 1 KHz.

As pointed out earlier, the details of the bias circuit are not critical, although the bridge/blind sensor approach is useful, particularly for microbolometer sensors. Also, multiple active bias elements and multiple clock signals and/or timing may be employed as long as the sensor continues to be connected to the bias and the active elements spend at least some time in accumulation. Although the current disclosure describes analog and digital circuit element as being, or made of, "mosfets", it is understood that the integrated circuit fabrication technology used is by way of example, but it is the functional attributes of the circuit elements, regardless of their underlying fabrication, that is affected by the teachings of the current disclosure. It should also be noted that although the disclosure uses the example of FPA's with multiple sensors, single sensor or small array sensors are also useful for some applications. Such sensors may require biasing and the teachings of the current disclosure apply to these cases as well.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the elements illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

The invention claimed is:

1. A bias circuit for a photodetector readout circuit, comprising:
   at least a first mosfet and a second mosfet in parallel with each other in series with the photodetector;
   at least two clocking signals at least partially out of phase with each other, wherein;
   one clocking signal is applied to a switch switching the gate of the first mosfet between two voltage levels and the other clocking signal is applied to a switch switching the gate of the second mosfet between the same two voltage levels;
   the two voltage levels are a control voltage suitable to activate the mosfet to a predetermined level, and a voltage suitable to drive the mosfets into accumulation whereby at least one of the parallel mosfets is activated while at least one other is in accumulation for corresponding periods of time.

2. The bias circuit of claim 1 wherein a clocking rate of the clocking signals is greater than the 1/f noise knee of the noise power spectral density from the parallel mosfets operating without clocking is equal to the sensor's white noise floor.

3. The bias circuit of claim 2 wherein the photodetector is part of an imaging array, and the imaging period is at least a portion of an image frame rate period.

4. The bias circuit of claim 1 further comprising switches which switch the polarity of the photodetector relative to the two parallel mosfets.

5. The bias circuit of claim 4 wherein the polarity switches are each actuated by one each of the same two at least partially out of phase clocking signals.

6. The bias circuit of claim 5 wherein the polarity of the photodetector is switched relative to the mosfet currently not in accumulation on each cycle.

7. The bias circuit of claim 1 wherein the photodetector is a photoconductive detector.

8. The bias circuit of claim 1 wherein the photodetector is a bolometer.

9. A bias circuit for a photodetector readout circuit, comprising:
   a current source in series with a blind reference photodetector in one leg of a bridge circuit;
   a current mirror configured to mirror voltage present on the blind reference photodetector onto an active photodetector;
   at least two clocking signals at least partially out of phase with each other, wherein;
   a current mirror comprises at least a first and a second mosfet in parallel with each other and in series to the active photodetector;
   one clocking signal is applied to a switch switching the gate of the first mosfet between two voltage levels and the other clocking signal is applied to a switch switching the gate of the second mosfet between the same two voltage levels;
   the voltage levels are the current mirror control voltage suitable to activate the mosfet to a predetermined level and bias the photo detector and a voltage suitable to drive the mosfets into accumulation whereby at least one of the parallel mosfets is activated while at least one other is in accumulation for corresponding periods of time.

10. The bias circuit of claim 9 wherein a clocking rate of the clocking signals is greater the 1/f noise "knee" of the noise power spectral density from the parallel mosfets operating without clocking is equal to the sensor's white noise floor.

11. The bias circuit of claim 9 wherein the photodetector is part of an imaging array, and the imaging period is at least a portion of an image frame rate.

12. The bias circuit of claim 9 further comprising switches which switch the polarity of the photodetector relative to the two parallel mosfets.

13. The bias circuit of claim 12 wherein the polarity switches are each actuated by one each of the same two at least partially out of phase clocking signals.

14. The bias circuit of claim 13 wherein the polarity of the photodetector is switched relative to the mosfet currently not in accumulation on each cycle.

15. The bias circuit of claim 9 wherein the photodetector is a photoconductive detector.

16. The bias circuit of claim 9 wherein the photodetector is a bolometer.

* * * * *